No. 753,068. PATENTED FEB. 23, 1904.
J. L. HANER.
ANIMAL CATCHER AND HOLDER.
APPLICATION FILED DEC. 17, 1903.
NO MODEL.
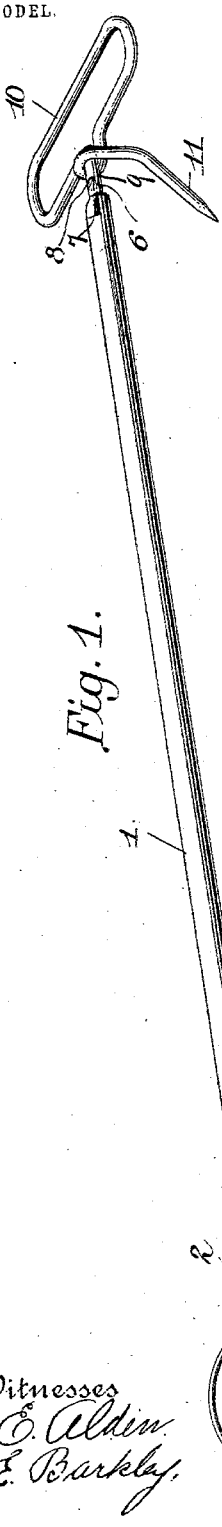
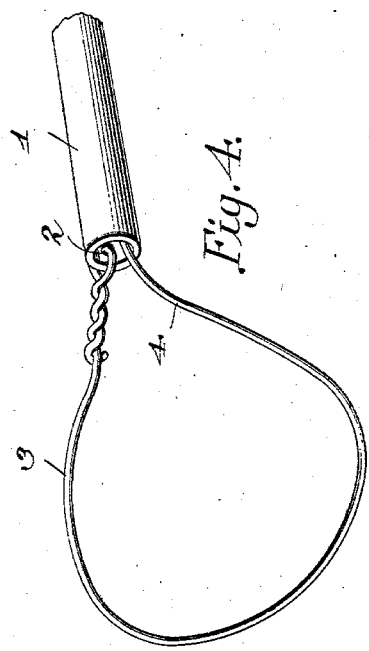
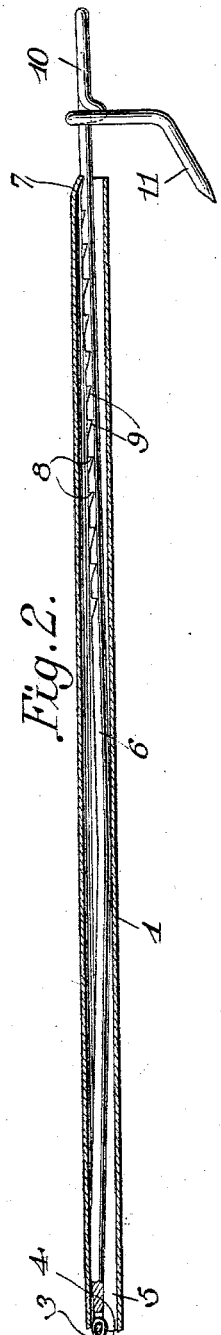
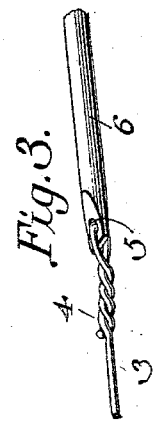
Jacob L. Haner, Inventor.

No. 753,068.

Patented February 23, 1904.

UNITED STATES PATENT OFFICE.

JACOB L. HANER, OF LONDON, OHIO.

ANIMAL CATCHER AND HOLDER.

SPECIFICATION forming part of Letters Patent No. 753,068, dated February 23, 1904.

Application filed December 17, 1903. Serial No. 185,574. (No model.)

*To all whom it may concern:*

Be it known that I, JACOB L. HANER, a citizen of the United States of America, residing at London, in the county of Madison and State of Ohio, have invented certain new and useful Improvements in Animal Catchers and Holders, of which the following is a specification.

This invention relates to the care of live stock, and particularly to a class thereunder known as "animal catchers and holders."

The object of this invention is to provide an animal catcher and holder which will hold the parts in their adjusted position for retaining the device in engagement with the leg or snout or other part of the animal.

Furthermore, an object of the invention is to provide novel means for anchoring the device and holding the same independent of the operator, thereby leaving the operator free after the animal has been caught.

A further object of the invention is to provide an animal catcher and holder in which the device is readily released by a simple pressure of the operating-rod, the said pressure being applied in relation to the casing or handle.

Finally, an object of the invention is to provide an animal catcher and holder of the character noted which will possess advantages in points of efficiency and durability, proving at the same time comparatively inexpensive to manufacture.

With the foregoing and other objects in view the invention consists in the details of construction and in the arrangement and combination of parts, to be hereinafter more fully set forth and claimed.

In describing the invention in detail reference will be had to the accompanying drawings, forming part of this specification, wherein like characters denote corresponding parts throughout the several views, and in which—

Figure 1 is a view in perspective illustrating an animal catcher and holder embodying the invention. Fig. 2 is a longitudinal sectional view thereof. Fig. 3 is a perspective view of a fragment of the rod and the flexible connection. Fig. 4 illustrates a fragment of the tube and the flexible connection.

In the drawings, 1 denotes a handle comprising a tube which may be made of gas-pipe or any suitable metal, the said handle having at its outer end an eye 2 for the reception of the loop 3 of the flexible connection 4. The loop is secured by twisting the flexible connection or by knotting it, according to the material—that is, whether it is a wire or cord. The opposite end of the connection from that secured to the tube is inserted in the tube and is secured to the eye 5, formed in the end of the sliding rod 6, which is inserted in the front end of the tube. The front end of the tube is flattened, as at 7, to form a detent for engaging the shoulders 8, formed by the transverse notches 9 along the outer end of the sliding rod. The portion of the sliding rod within the tube is bent in a manner to cause the said rod to spring, with its shoulders in engagement with the detent of the tube. Thus as the loop of the flexible connection is caused to encircle the leg or snout or other part of an animal and the same is pulled close around its leg or snout or other part the sliding rod will automatically engage the detent and prevent loosening of the flexible connection, except where the said rod is intentionally pushed away from the detent, when of course the said rod is free to slide inwardly. The outer end of the rod is bent to form a loop 10, which acts as a handle for manipulating the said rod. The extremity of the rod is bent around the body of the rod and terminates in a spur 11, which acts as an anchor for securing the animal after it has been caught. This spur may be embedded in the ground or it may be caused to engage a post or other stationary device. If desired, the spur may be placed on the handle.

The construction, operation, and advantages will, it is thought, be understood from the foregoing description, it being noted that various changes may be resorted to in the proportions and details of construction for successfully carrying the invention into practice without departing from its scope.

Having fully described the invention, what I claim as new, and desire to secure by Letters Patent, is—

1. In an animal catcher and holder, a hollow handle having its outer end flattened to form a detent, a rod slidable in the handle and having shoulders on its outer end adapted to be engaged by the detent and in combination therewith, a flexible connection for one end secured to the rod and its opposite end secured to the casing.

2. In an animal catcher and holder, a hollow handle having its outer end flattened to form a detent, a rod slidable in the handle and having shoulders adapted to be engaged by the detent, the said rod being bent to normally hold the outer end in contact with the detent, and in combination therewith, a flexible connection secured to the inner end of the rod, the opposite end of the flexible connection being secured to the handle.

3. In an animal catcher and holder, a hollow handle having its outer end bent to form a detent, a rod slidable in the handle and having shoulders adapted to be engaged by the detent, the said rod being bent to normally hold the outer end in contact with the detent, and in combination therewith, a flexible connection secured to the inner end of the rod, the opposite end of the flexible connection being secured to the handle, and a spur formed on the outer end of the rod or handle.

4. In an animal catcher and holder, a hollow handle having its outer end bent to form a detent, a rod slidable in the handle and having shoulders adapted to be engaged by the detent the said rod being bent to normally hold the outer end in contact with the detent, and in combination therewith, a flexible connection secured to the inner end of the rod, the opposite end of the flexible connection being secured to the handle, and a spur formed on the rod or handle for anchoring the device.

In testimony whereof I affix my signature, in the presence of two witnesses, this 12th day of December, 1903.

JACOB L. HANER.

Witnesses:
W. E. BARR,
B. P. JONES.